(12) United States Patent
Olson

(10) Patent No.: US 11,294,048 B2
(45) Date of Patent: Apr. 5, 2022

(54) RADAR SYSTEM TO TRACK LOW FLYING UNMANNED AERIAL VEHICLES AND OBJECTS

(71) Applicant: Rhombus Systems Group, Inc., Philadelphia, PA (US)

(72) Inventor: Erlend Olson, Newport Beach, CA (US)

(73) Assignee: Rhombus Systems Group, Inc., Philadelphia, PA (US)

( * ) Notice: Subject to any disclaimer, the term of this patent is extended or adjusted under 35 U.S.C. 154(b) by 175 days.

(21) Appl. No.: 15/608,612

(22) Filed: May 30, 2017

(65) Prior Publication Data

US 2018/0003816 A1 Jan. 4, 2018

Related U.S. Application Data

(60) Provisional application No. 62/342,585, filed on May 27, 2016.

(51) Int. Cl.
*G01S 13/91* (2006.01)
*G01S 13/87* (2006.01)
(Continued)

(52) U.S. Cl.
CPC .............. *G01S 13/91* (2013.01); *G01S 7/006* (2013.01); *G01S 7/354* (2013.01); *G01S 13/003* (2013.01);
(Continued)

(58) Field of Classification Search
CPC ........ G01S 13/91; G01S 7/006; G01S 13/003; G01S 13/04; G01S 13/878; G01S 13/9303
See application file for complete search history.

(56) References Cited

U.S. PATENT DOCUMENTS

| 4,042,925 A | 4/1977 | Albanese et al. |
| 5,093,663 A | 3/1992 | Baechtiger et al. |

(Continued)

FOREIGN PATENT DOCUMENTS

| CN | 101986169 A | 3/2011 |
| EP | 2369365 A1 | 9/2011 |

(Continued)

OTHER PUBLICATIONS

Roland Minihold/Dieter Bues;"Introduction to Radar System and Component Tests", White Paper, IMA207_0e; Rohde & Schwarz; p. 1-28.

(Continued)

*Primary Examiner* — Marc Anthony Armand
(74) *Attorney, Agent, or Firm* — Bonini IP Law, LLC; Frank J. Bonini, Jr.

(57) ABSTRACT

A radar system for tracking UAVs and other low flying objects utilizing wireless networking equipment is provided. The system is implemented as a distributed low altitude radar system where transmitting antennas are coupled with the wireless networking equipment to radiate signals in a skyward direction. A receiving antenna or array receives signals radiated from the transmitting antenna, and in particular, signals or echoes reflected from the object in the skyward detection region. One or more processing components is electronically coupled with the wireless networking equipment and receiving antenna to receive and manipulate signal information to provide recognition of and track low flying objects and their movement within the coverage region. The system may provide detection of objects throughout a plurality of regions by networking regional nodes, and aggregating the information to detect and track UAVs and other low flying objects as they move within the detection regions.

29 Claims, 2 Drawing Sheets

(51) Int. Cl.
  *G01S 13/00* (2006.01)
  *G01S 7/00* (2006.01)
  *G01S 13/933* (2020.01)
  *G01S 7/35* (2006.01)
  *G01S 13/04* (2006.01)
  *H04B 7/185* (2006.01)

(52) U.S. Cl.
  CPC ............ *G01S 13/04* (2013.01); *G01S 13/878* (2013.01); *G01S 13/933* (2020.01); *H04B 7/18506* (2013.01)

(56) References Cited

U.S. PATENT DOCUMENTS

| | | | |
|---|---|---|---|
| 5,276,449 A | 1/1994 | Walsh | |
| 6,177,903 B1* | 1/2001 | Fullerton | G01S 7/003 342/21 |
| 7,109,916 B2 | 9/2006 | Klinnert et al. | |
| 9,057,785 B1* | 6/2015 | Lee | G01S 13/95 |
| 10,310,066 B1* | 6/2019 | Zatman | G01S 13/46 |
| 2003/0006930 A1* | 1/2003 | Lodwig | G01S 13/878 342/120 |
| 2007/0210953 A1 | 9/2007 | Abraham et al. | |
| 2008/0088508 A1 | 4/2008 | Smith | |
| 2010/0087980 A1 | 4/2010 | Spura | |
| 2010/0121574 A1 | 5/2010 | Ariyur et al. | |
| 2010/0194622 A1* | 8/2010 | Clingman | G01S 13/765 342/37 |
| 2011/0241928 A1 | 10/2011 | Oswald et al. | |
| 2013/0070677 A1* | 3/2013 | Chang | H04B 7/18517 370/328 |
| 2013/0285848 A1* | 10/2013 | Grau Besoli | G01S 13/428 342/134 |
| 2015/0378004 A1 | 12/2015 | Wilson-Langman et al. | |
| 2018/0024236 A1* | 1/2018 | Zorea | G08G 5/0078 342/30 |
| 2018/0152909 A1 | 5/2018 | Hanes et al. | |

FOREIGN PATENT DOCUMENTS

| | | |
|---|---|---|
| JP | 1999030659 | 2/1992 |
| JP | 2005156276 | 6/2005 |
| JP | 2008304329 | 12/2008 |

OTHER PUBLICATIONS

Xu, Jing et al., "Simulation of Coherent Radar Imaging Using Continuous Wave Noise Radar"; Journal of Atmospheric and Oceanic Technology, vol. 26, pp. 1956-1967; © 2009 American Meteorological Society; Sep. 2009.

Pisane, Jonathan; "Automatic target recognition using passive bistatic radar signals"; Jan. 2013; © Copyright Université de Liège, © Copyright SUPELEC—Paris XL.

Vierinen, Juha et al.; "Coded continuous wave meteor radar"; Atmospheric Measurement Techniques, 9, 829-839, 2016; www.atmos-meas-tech.net/9/829/2016/.

Knoedler, Benjamin, et al. "On the Detection of Small UAV Using a GSM Passive Coherent Location System", 2016 17th International Radar Symposium (IRS), IEEE, May 10, 2016 (May 10, 2016), pp. 1-4.

* cited by examiner

RADAR SYSTEM TO TRACK LOW FLYING UNMANNED AERIAL VEHICLES AND OBJECTS

CROSS-REFERENCE TO RELATED APPLICATIONS

This patent application claims the benefit under 35 U.S.C. 119 and 35 U.S.C. 120 of U.S. provisional application Ser. No. 62/342,585 entitled "Radar System to Track Low Flying Unmanned Aerial Vehicles and Objects", filed May 27, 2016, the complete contents of which is herein incorporated by reference.

BACKGROUND OF THE INVENTION

1. Field of the Invention

The invention relates to the field of unmanned aerial vehicles (UAVs) and more particularly to systems, methods and apparatus for tracking UAVs and low flying objects.

2. Brief Description of the Related Art

A problem exists today with verifying the location of beyond-line-of-sight unmanned aerial vehicles (UAVs). When UAVs are beyond-line-of-sight of their operator, or when they are operating autonomously or under the control of an autonomous air traffic control system, they are often operating well below the elevation at which traditional air traffic control radar can 'see' them. Radar (or RADAR) is an acronym for radio detection and ranging. In addition, although the UAV may self-report its position over a communications network, there still exist many situations in which the UAV is inaccurate reporting its own position, or temporarily unable to do so. In addition, because low altitude UAVs are often in close airspace proximity to one another, and may also be in the same airspace as birds, balloons or even other manned aircraft which do not self-report their position to a UAV air traffic control system, a method of independently mapping objects in low altitude airspace is needed.

Such a function generally has been handled by radar systems, however there are special considerations for low altitude radar for the purpose of mapping low altitude-use UAV airspace that differentiate it from traditional radars. First and foremost, radar that covers low altitudes cannot by nature be long range. Ground clutter is a significant issue for radar that attempt to cover low altitudes from distances typically associated with air traffic control radar. Also, the size of UAVs and other low-altitude airspace occupants, such as birds, renders their radar cross sections too small to be observable from long distances typically associated with air traffic control radar. Therefore a short range radar system which can 'see' small radar cross section targets and can avoid ground clutter issues is needed.

SUMMARY OF THE INVENTION

A radar system for tracking UAVs and other low flying objects is provided. According to preferred embodiments, the system is implemented as a distributed low altitude radar system. The system is designed to provide tracking of objects utilizing wireless networking equipment for producing RF signals. A transmitting antenna, and preferably a plurality of transmitting antennas, is coupled with the wireless networking equipment for radiating signals in a skyward direction. The transmitting antennas of the system preferably are cellular antennas, such as, for example, those on cell towers, which are provided for communication of cellular signals. A receiving antenna receives signals radiated from the transmitting antenna, and in particular, signals that are reflected from a low flying object, such as a UAV and other objects (e.g., birds, balloons, and the like). The receiving antenna according to preferred implementations is a separate antenna for receiving the transmissions or echoes that are reflected off of objects. A plurality of receiving antennas are provided, and preferably a receiving antenna is disposed at or in proximity to each transmitting antenna. A plurality of transmitting antennas may be provided at a single location, and one or more receiving antennas also may be provided at or proximal to the transmitting antenna location. The presence, direction and speed of an object may be determined by utilizing RF transmissions broadcast from transmitting antennas configured to deliver communications to a skyward object, such as, for example, a UAV operating within the antenna broadcast range. The RF transmissions preferably may be communications transmissions for relaying a datagram, voice or other information in the skyward direction that are generated by wireless network communications components. An associated RADAR antenna receives echoes of the RF transmission based on objects within the transmission region. The radar antenna is connected to provide signals to a radar processor, which may be a computing component, such as a computer that is provided with software containing instructions to carry out processing of the information from the radar antenna. Embodiments of the system also are configured to have a copy of the transmission signal that is broadcast skyward provided to the radar processor. The radar processor therefore receives the signal from the transmitter and receives echoes as a result of that signal being broadcast skyward (and potentially reflecting off of objects). The radar processor may be configured to minimize the potential for strong signals that may be the result of transmissions off of a nearby mountain, or other object.

Embodiments of the system preferably are implemented with a plurality of radar receiving antennas arranged at or near the location of the skyward transmitters. The radar receiving antennas preferably are arranged to provide the radar detection information to a computing component, such as a computer, that aggregates the radar receiving responses. According to some embodiments, where a radar processor associated radar antenna is proximal to a plurality of transmitters broadcasting skyward signals, then the radar processor may receive signal copies from each of those transmitters.

Embodiments of the system preferably are configured to utilize codes from the skyward communications transmissions between transmitting transceivers. The RF transmission from the transmitting antenna may include codes from the RF communications transmission, and these codes, which are part of the RF communications with a UAV (such as broadcasting datagrams to the UAV) may be utilized by the radar processor to provide detection of skyward objects. The codes may be transmitted skyward and also may be sent to the associated radar processor as part of the copy of the transmission. According to some embodiments, an aggregator may further process the radar detection information from a plurality of radar processors to provide detection of objects that may be within range of a plurality of transmitter broadcasts. According to some embodiments, the aggregator may be a computer that receives the radar information from a plurality of radar processors and processes the radar information to provide detection of the objects as they move throughout skyward regions.

The system may be implemented as a distributed network, where a node of the system is configured to detect signals produced from objects within the zone or region covered by the node. According to a preferred implementation, a radar processor is electronically coupled with the wireless networking equipment to receive signals. A receiving antenna is provided to receive the transmission signals, which include RF transmission signals that are reflected off of a low flying object, such as a UAV, bird or other object in the sky (e.g., within a region or elevated level being monitored for detection). The radar processor preferably is electronically coupled to the receiving antenna to receive signals therefrom. The radar processor may manipulate the signals through a variety of signal processing applications, which may include beamforming manipulations as well as signal conditioning. The detection signals are processed, and preferably, the system manipulates the signal information and aggregates detection signals from the network nodes. A computing component coupled to receive information from the radar processors of the network or network region, aggregates the information and tracks the objects as they move through the skyward regions of the network. The object may be identified by the signals and the radar processor may implement comparisons for recognition of the object pattern via comparison to object profile data to determine the type of object. The processing of the signal information also may determine object attributes, such as, object movement, velocity, size, and flight path. The movement of the object may be tracked as the object moves through the skyward region of detection. The computing component is configured to receive information from the radar processors distributed throughout a network and aggregate the information to detect low flying objects over the region of coverage.

A principal feature of the disclosed radar system is that it is distributed, in that it relies on a distributed network of ground based communications transmitters, such as, for example, with a cellular-type UAV command and control system such as disclosed in my other pending patent applications, namely, U.S. patent application Ser. No. 62/214,053, filed on Sep. 3, 2015, and U.S. patent application Ser. No. 62/323,957, filed on Apr. 18, 2016, the complete contents of which are herein incorporated by reference. This distributed network enables the disclosed radar system to have the signal source part of the disclosed radar system relatively close to the targets for which it is intended to detect and track.

Another feature of the disclosed radar system is that the signals employed for detection are propagated primarily in an upward direction at a small region of sky, rather than more horizontally, enabling the system to significantly avoid reflections from buildings, trees and other ground-clutter related items. Accordingly, the detection signals may be directed skyward within a particular region being monitored.

Another feature of the disclosed radar system is that it relies on communications signals which are being transmitted for the original purpose of communicating with aircraft or UAVs, and, therefore, in accordance with preferred implementations of the system, new spectrum and new transmitting apparatus are not required. Embodiments of the detection system may be implemented in conjunction with the UAV communication systems, and may use some or all of the networking components of that system.

In addition, because communications signals are often longer in duration than traditional chirps associated with traditional radar, longer integration times may be employed in detection and ranging algorithms, which improves the performance of the disclosed system over more traditional radar systems. The effect of reduction of range ambiguity and enhancement of detection are enhanced by the use of pseudo-random coded (PRC) continuous wave bi-static radar systems, by the means well known to those practiced in the radar sciences. By employing a bi-static configuration with regular communication signals which may somewhat naturally emulate a PRC code, similar gains with this disclosed system to that of a fully PRC coded bi-static radar system are realized.

These and other advantages of the invention are described herein and illustrated in connection with the exemplary embodiments.

BRIEF DESCRIPTION OF THE DRAWING FIGURES

DETAILED DESCRIPTION OF THE INVENTION

Figure 1:
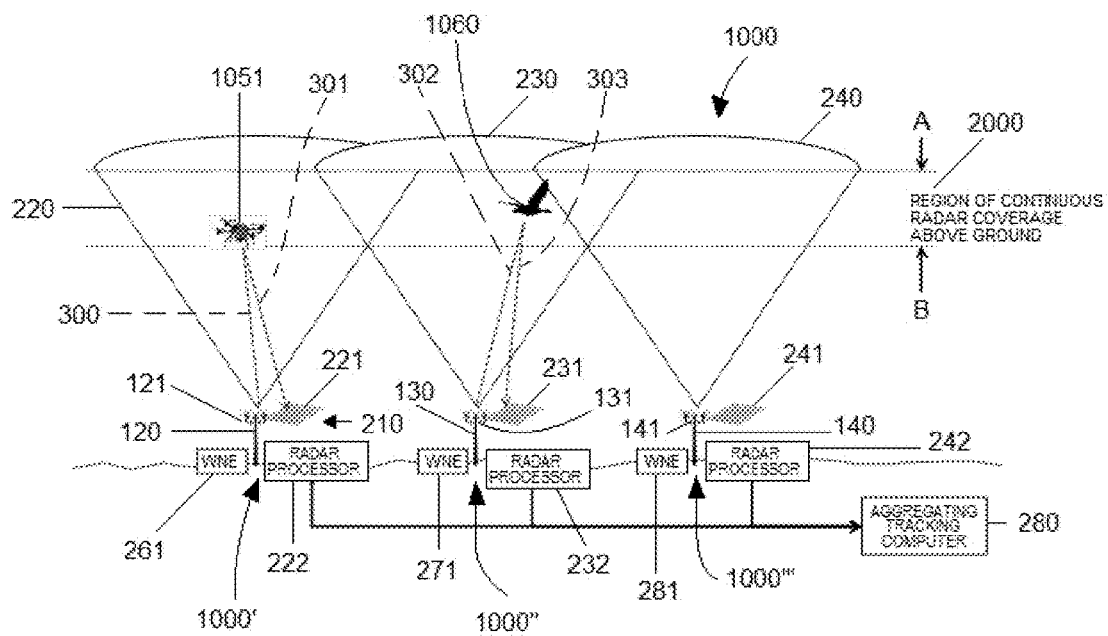
FIG. 1 is an illustration depicting an exemplary embodiment of a system for tracking low flying objects, in accordance with the invention.
Figure 2:
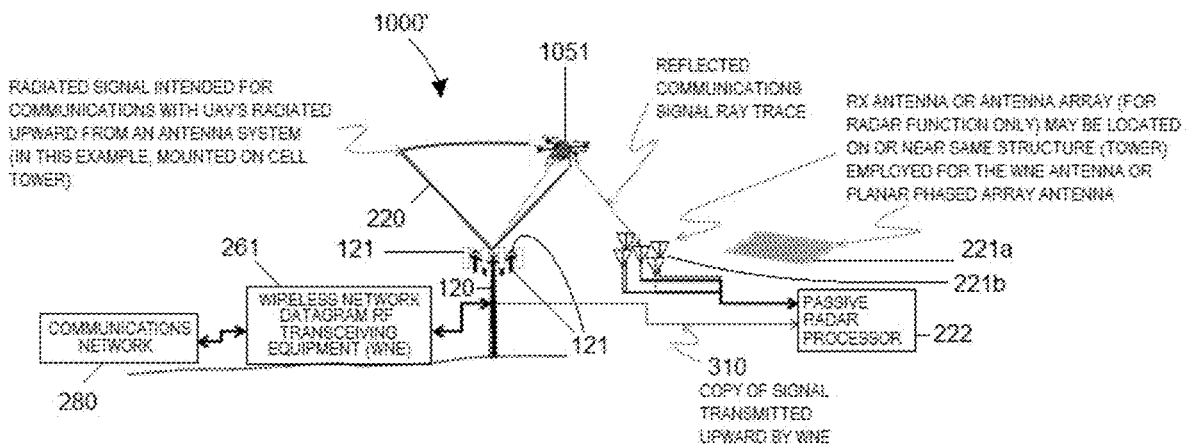
FIG. 2 is an illustration of an exemplary embodiment of a node of the system depicted in FIG. 1.
Figure 3:
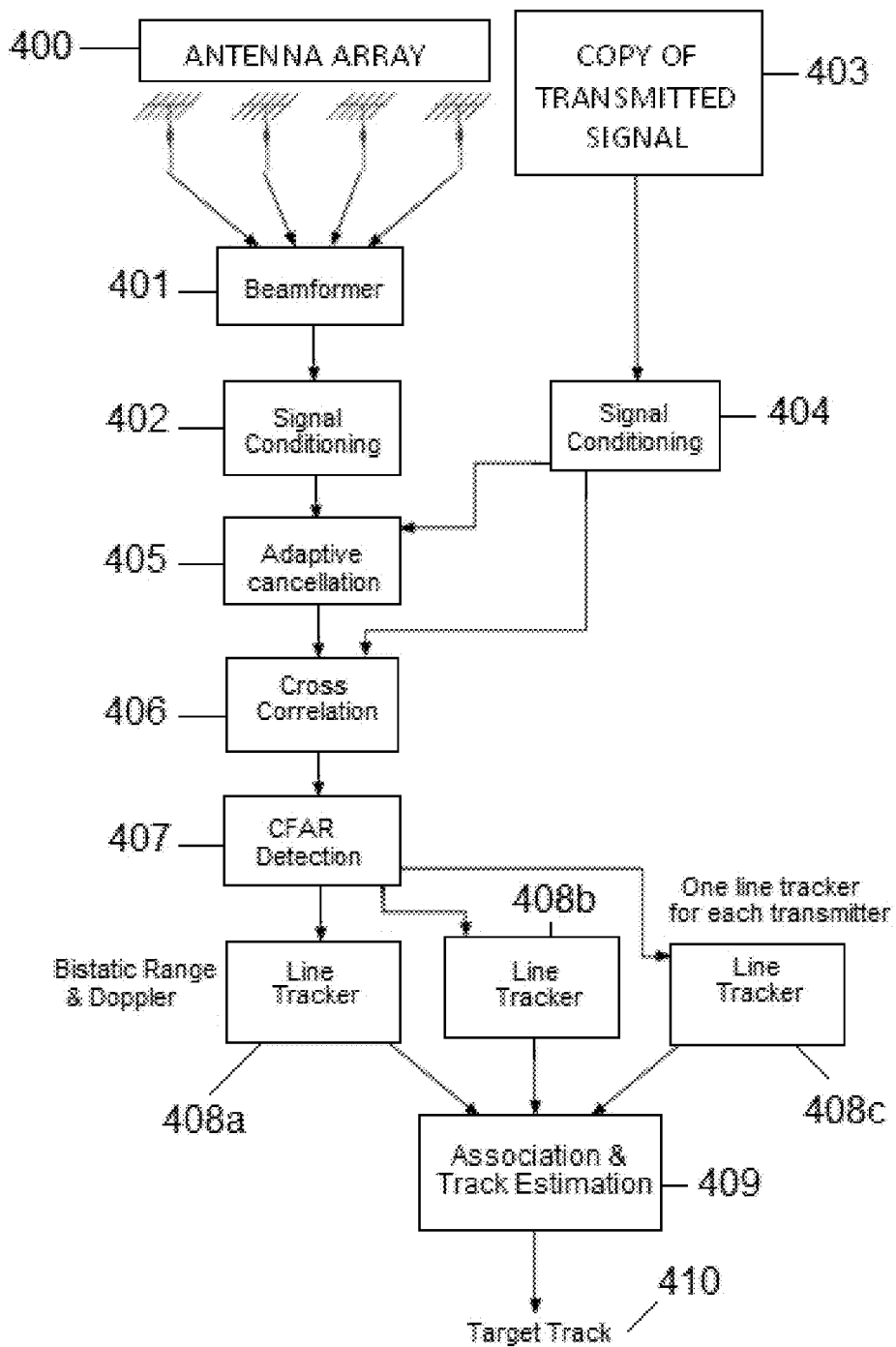
FIG. 3 is a diagram illustrating an example of a passive radar processor system that may be utilized in conjunction with the system of the invention.

Referring to FIGS. 1 to 3, an exemplary embodiment of a system for tracking low flying objects, and in particular for tracking low flying unmanned aerial vehicles (UAVs) and other objects, is depicted. The system may be implemented in accordance with the methods disclosed herein, and apparatus may be provided and configured for implementing the system and method. According to preferred embodiments, the system may be implemented in conjunction with existing cell towers. Alternatively, the system may be implemented with existing cell towers and some additional components, or, according to some other alternate embodiments, may be implemented using separately provided towers, transmitters and other components that are dedicated to UAV/RPV communications. According to other embodiments, the system may be implemented using a separate distributed network of ground based communications transmitters.

The implementation of the system in accordance with the present invention is illustrated in accordance with an exemplary embodiment, where components are arranged to track low flying objects, such as, for example, UAVs and other objects. In the exemplary depiction of FIG. 1, as a bird 1060 or UAV 1051 flies through a region covered by 'cell type' grid of communications datagram transceivers, it can be tracked by the system. The network is depicted comprised of nodes, 1000', 1000'', 1000''' (and may include a number of additional nodes, not shown). Each node 1000', 1000'', 1000''' contains relevant communications equipment and its own local antenna array or phased array antenna for receiving reflections from objects in the region of coverage, and has a radar processing capability, which is networked to other nodes and returns data to a central aggregating tracking computer 280 to provide regional tracking of object across multiple nodes deployed over a region.

As depicted in FIG. 1, an arrangement of cell towers 120, 130, 140 is provided to represent a segment of a distributed network for carrying out tracking of UAV's and other low flying objects. In this exemplary embodiment, a network communication system 1000 is illustrated, and three nodes 1000', 1000", 1000''' are depicted (there being other similar nodes provided throughout the detection region to comprise the distributed network). Each node 1000', 1000", 1000''' is illustrated being represented by a respective tower 120, 130, 140, respectively associated wireless networking communication equipment (WNE) 261, 271, 281, and radar detection components. The wireless networking communications equipment (WNE) 261, 271, 281 preferably includes transceiving equipment, which may include a transceiver that is coupled with one or more antennas (e.g., 121, 131, 141). The towers 120, 130, 140 preferably are equipped with one or more associated antennas (e.g., 121, 131, 141), and may include an antenna array supported thereon. The system may be implemented using the communications systems disclosed in my U.S. patent applications referenced herein, so that the transceivers and transmitting antennas of those skyward UAV communications systems may be utilized in conjunction with the radar detection system, and preferably with the radar detection components.

The towers 120, 130, 140 preferably are equipped with or have associated therewith, respective communications equipment, such as, for example, transceivers, antennas, power supplies, and other equipment for generating and receiving cellular communications. In the exemplary depiction shown in FIG. 1, each tower 120, 130, 140 is configured with RF generating equipment, such as, for example, wireless network datagram RF transceiving equipment (WNE), 261, 271, 281 associated with each respective antenna (or antenna array) 121, 131, 141. The wireless network datagram RF transceiving equipment (WNE) preferably comprises components for generating and receiving signals through a communications network (such as the network 1000, FIG. 1, and portion thereof 1000', FIG. 2) and devices communicating over the network, such as, for example, the UAV 1051 which is configured with its own transceiving equipment to enable it to receive and/or transmit signals and datagrams. The wireless network datagram RF transceiving equipment (WNE) (see e.g., 261, 271, 281) preferably includes signal processing and generating components, and provides the signals to the plurality of associated antennas, 121, 131, 141, that radiate signals upward, in a skyward direction, for communications with a UAV 1051. The signals preferably are radiated in a skyward cone pattern, and skyward radiation cones 220, 230, and 240 are depicted to represent the area of signal coverage. The radiation signals are generated to provide an elevated region of continuous coverage 2000 above the ground. This may be accomplished by positioning the antennas, or tuning them, to produce the desired region of coverage. The region between arrows A and B in FIG. 1, represents a region of continuous radar coverage 2000 provided at an elevated level relative to the ground and is illustrated in the exemplary embodiment formed by the radiation cones 220, 230, 240, and in particular elevated regions of those cones. The elevated region 2000 preferably is provided at a range (between arrows A and B in this illustration) represents a radar coverage region in which the presence of low flying objects may be detected.

As depicted in FIGS. 1 and 2, the RF signals point directionally upward into the sky. In the example illustrated, radiated signals 220, 230, 240 are propagated from respectively associated antennas (or antenna groups) 121, 131, 141, which in this depiction is from a cell tower system comprising the respective cell towers 120, 130, 140. The signals are radiated upward and preferably may be controlled to provide the suitable signal strength for communications with devices in the region 2000 and/or reflections off of the devices.

A radar detection mechanism is illustrated in conjunction with a cellular network communication system. The cellular communications system illustrated is configured for communications with a UAV and preferably comprises a skyward projected cellular system. The skyward cellular communications system may provide separate frequencies or bands for communications of the command, control and/or navigation functions of the UAV (and another frequency or range of frequencies for other types of UAV communications, e.g., camera operation and feed, etc.). In the illustration of FIG. 1, a radar detection mechanism is shown provided in conjunction with a cellular communication arrangement. The radar detection mechanism preferably is configured with an antenna or antenna array for receiving signals, and a radar processor for processing the signals. In FIG. 1, an exemplary embodiment of the system is illustrated, including a radar detection mechanism 210 for detecting skyward objects, such as UAVs and other objects. The radar detection mechanism 210 is illustrated in connection with a first communication tower, such as the cell tower 120, where a signal detecting receiving antenna 221 and an associated radar processor 222 are provided. The signal detecting receiving antenna 221 preferably may comprise an RX antenna or antenna array (e.g., a receiving antenna 221*a* or antenna array 221*b*) that receives RF signals generated by the WNE 261 and emitted from the antenna or antennas 121, and which include reflected signals or echoes from objects. Preferably, the antenna 221 is dedicated to the radar detecting functions. The RX antenna or antenna array 221*a*, 221*b* (for radar function only) may be located on or near the same structure, such as a tower 120, employed for the WNE antenna or planar phased array antenna. The antenna 221 may be located on or near the tower employed for the wireless network (WNE). For example, in FIG. 1, where the system is employed in conjunction with a wireless communications network, the tower 120 is shown with a plurality of antennas 121, or antenna array, for carrying out wireless communications over a network (e.g., between the network and communicating devices), and with a radar antenna 221 also supported on the tower 120. Additional antennas 231, 241 on the respective towers 130, 140, are illustrated along with respectively associated radar processors 232, 242, which preferably are configured to function in connection with the respective WNE 271, 281. The radar mechanism is configured to detect UAVs and low flying objects. According to preferred embodiments, the radar tracking system utilizes the network 1000 for communicating signals to provide the radar functions. Radar antennas 221, 231, 241 may be supported on the cell towers 120, 130, 140 and configured to operate in conjunction with the associated cellular communication components (such as the WNE 261, 271, 281) that relay signals for communication exchanges between transmitting and/or receiving components of the communications network 1000 (which, for example, according to some embodiments is a communications network for communications with UAVs and command and control computers).

The radar detection mechanism, in addition to the WNE and radar antennas 221, 231, 241, preferably includes respectively associated radar processors 222, 232, 242. A radar processor may be configured with instructions for monitoring the signals transmitted from the associated WNE, such as, for example, the WNE wireless transceiver.

According to preferred configurations, a radar processor (222, 232, 242) is associated with a cell tower (120, 130, 140) and provides detection within the tower range, such as, for example, the propagation area represented by the respective signal cones 220, 230, 240 generated by the tower antenna arrangements 121, 131, 141 (see FIG. 1). Each radar processor 222, 232, 242 is configured to generate or monitor signals, which are propagated through the transceiver associated antenna (e.g., such as the arrangement of antennas 121 on the tower 120 in FIG. 1). The signal is represented by the broken line 300, and, as illustrated, is reflected upon encountering an object, such as, for example, in the exemplary depiction, the UAV 1051. The reflected wave, which also may be referred to as an echo, represented by the broken line 301 is picked up by the antenna 221, which in this embodiment, is a receiving antenna provided to receive reflected signals (which is illustrated reflected off of the UAV 1051). The UAV 1051 may be configured with a reflector, such as a corner reflector, for facilitating the reflected signal by accentuating its return to the radar node. The radar processor 222 receives the reflected signal or echo 301. The radar processor 222 preferably is configured with computing components that may receive, store and process data to provide detection of objects in the airspace being monitored by the radar mechanism (such as low flying objects).

In FIG. 1 the cellular communications network 1000 (or portion thereof) is represented and is configured to provide communications for low flying objects, such as, UAVs, through a skyward system. The radar system is distributed over a network of ground-based communications transmitters, which preferably comprise components of the network 1000. The signal source component of the radar system may be configured to be effectively relatively close in proximity to those targets, such as UAVs and other low flying objects that the system is intended to detect. The skyward radar detection system is shown in the exemplary illustration configured with a region of coverage 2000. Objects within this region may be tracked. For example, in FIG. 1, an object, represented as a bird 1060 is shown in the region of continuous coverage 2000, and positioned within the signal cone of radiation 230 generated by the wireless network datagram RF transceiving equipment (WNE) 271, associated with the tower 130 and arranged antennas 131. An associated radar processor 232 is shown and receives data, which preferably includes a copy of the signal transmitted by the WNE 271. The system preferably is configured to generate signals within the transmission region, such as, for example, the region represented by the cone 230, that may comprise brief communications burst, which is picked up by the proximally located receiving antenna 231, and which are monitored with a processing and/or monitoring component, such as, the radar processor 242. In the embodiment illustrated, the signal 302 is transmitted from a transmitter (e.g., a transmitter of the WNE 251), and encounters the bird 1060 in the region 2000. The signal 302 reaches the bird 1060 and the signal or echo 303 is reflected off of the bird 1060. The reflected signal 303 is picked up by the receiving antenna 231 and made available to the radar processor 232. The radar processor now has the copy of the signal transmitted from the WNE 251 and the echo signal 303.

According to the preferred embodiment illustrated, the system is configured to operate over a communications network, and preferably a distributed cellular communications network. The system preferably includes an aggregating computing component, such as, an aggregating tracking computer 280. The aggregating tracking computer 280 preferably is electronically connected to receive data, which may be in the form of signals associated with the propagation and reception of the detection signals, or a by-product of those signals. The aggregating tracking computer 280 preferably is configured to function as a central computing resource for a plurality of nodes of the network communications system. For example, the aggregating tracking computer 280 may be associated with a plurality of nodes of a region to provide regional tracking of the objects, such as the UAVs and other low flying objects. The aggregating tracking computer 280 receives and manages the detection information across the network 1000, and, as illustrated, is provided with the signal data from the network nodes 1000', 1000", 1000'''.

Referring to FIG. 2, an exemplary embodiment is illustrated depicting a node 1000' of the radar detection system 1000 for detecting and monitoring UAVs and other low flying objects within a skyward zone or region. In the system depicted, a communications system for communicating with UAVs by radiating a signal upwardly from an antenna system is illustrated. The node 1000' is shown comprising a tower 120 configured with antennas 121 and wireless network datagram RF transceiving equipment (WNE) 261. The WNE 261 preferably is part of a communications network 1000, and is electronically linked to exchange information, such as, communications and other data, over the network 1000. The node 1000' is illustrated comprising a portion of the tracking system. In FIG. 1, three nodes are illustrated, including a first node 1000', second node 1000" and third node 1000'''. The nodes 1000', 1000" and 1000''' comprise a communications network 1000, and preferably are arranged to provide coverage over a designated or desired zone or region of coverage. The nodes preferably are arranged so that there is coverage of the skyward region 2000 in the areas where monitoring is desired. In FIG. 1, three regions are depicted formed by the respective cones 120, 130, 140. The system preferably is configured to include additional towers and WNE to provide expansion over a network (other than those regions covered by the three nodes in FIG. 1). A computing component which preferably is arranged with a transceiver (which may be provided as part of or in association with the WNE 261), is configured to generate RF communication signals which are emitted from the antennas 121 and propagated in a skyward direction. This may be carried out as part of a cellular communications network, and more particularly, with the skyward directed communications systems disclosed in my prior applications referenced herein. The radar detection system may be implemented by providing the components in conjunction with existing cellular systems (as well as cellular systems configured to communicate through skyward communications zones).

The system is configured to monitor signals emitted from the antennas. The transmitting antennas 121, 131, 141, preferably are provided with RF signals from the respectively associated WNE 261, 271, 281. The signals are propagated upward in a skyward direction. The signal cones preferably are produced to provide a number of narrow regions of skyward directed coverage that avoids or may operate around structures. The signals preferably are propagated to provide detection coverage of a number of smaller regions that may be aggregated to provide an expansive coverage region. Preferably, the signal is generated having suitable strength to reach the region in which UAVs will be operating (and in which other objects desired to be detected may be present). A transmission signal is produced. The transmission signal is sent to the antenna 121 to radiate the signal upward, and a copy of the signal also is sent to the radar processor 222. The radar processor 222, therefore, receives the signal, and is provided with the time that the signal was generated. In practice, a number of signals are generated, and copies of the signals, including their times of generation, frequencies, modulated data (and other properties), are monitored by the radar processor 222. The radar processor 222 preferably is connected to receive signals from the receiving antenna 221. The receiving antenna 221 is provided to receive signals that are generated from the receiving antenna 121, including signals that may be reflected off of an object, such as, a UAV 1050 (or other object within the region of detection). The reflected signal 301 is processed and compared with the generated signal copy (provided to the radar processor (e.g., from the WNE 261). The reflected signals received at the receiving antenna may be received with other signals. The processing of the signals received from the receiving antenna (such as the antenna 221) is carried out to distinguish the reflected signals or echoes that are expected to result from the presence of flying objects within the detection zone. For example, copies of signals are provided to the radar processor over a continuous time frame, and even where no reflected signal is received back (or no signal indicating the presence of an object is received back), e.g., within a specific time duration, or for the signal frequency, the radar processor continues its monitoring status. However, where a reflected signal from a skyward object is received, the radar processor identifies the detection of an object, and may further process the signal along with other signals that are received to indicate the position and movement of the object. The radar detection system preferably is configured to continue monitoring of the signals, even when processing the detection of a reflected signal and identifying an object detected. The radar processor may identify more than one object within the skyward region covered by that node (or other region that the radar processor is designated to cover). According to some embodiments, the system may be configured to use frequencies that are the same as those communications made to the UAV. For example, where communications are transmitted from the antenna 121, in a skyward direction, intended for or to a UAV 1051 operating within the region 2000 (for example, over one sub-band, for payload applications, e.g., imaging, delivery, and the like, or over another designated sub-band reserved for critical UAV operation communications, such as, command, control and navigation functions), the radar processor may also receive a copy of the signal. The signal is produced by the wireless networking equipment (WNE), and preferably is radiated from the antennas 121, at a specific frequency and a copy of the signal provided to the radar processor 222. The radar processor 222 preferably is a passive radar processor, and may be configured to process the signal information in accordance with any one of a number of methods well known. Embodiments of the radar processor, such as the radar processor 222, may include a computing component, such as a processor, microprocessor, controller, microcontroller, microchip, or other processing circuitry, and storage media, such as flash memory or other memory chips, a hard drive or the like, for storing instructions that are used to instruct the processor to carry out processing of the signals received by the receiving antenna. The radar processor 222 preferably may be configured to store the raw or processed signal information, and/or to transmit that information to another computing component for further processing, or for storage. For example, the depiction in FIG. 1 shows three radar processors 222, 232, 242, which are associated with a node of the skyward network, and WNE of the node. The radar processors 222, 232, 242 are illustrated being connected for communication with a computer which is identified as an aggregating tracking computer 280. The tracking computer 280 may receive raw data from the radar processors 222, 232, 242, or according to some embodiments may receive processed signal data, or partially processed signal data. The aggregating tracking computer 280 preferably may identify skyward objects, such as UAVs and other low flying objects within the skyward regions of the network being monitored. The aggregating computer 280 itself or with another computing component, may manage airspace to provide alerts when potential hazards, such as, objects are nearby to each other (for example, where a UAV 1051 is proximate to a bird 1060, see FIG. 1). The radar tracking system may be operated in conjunction with a UAV traffic control system, and may be integrated with an autonomous air traffic control system that controls or manages the operations of autonomously operating UAVs. The radar system may be configured to process radar signals to provide for alerts or management of UAVs, which may include manipulation or controlling a UAV operation (e.g., flight path, direction, speed, etc.), where a detection of a potential threat or risk is determined (e.g., such as a nearby balloon, or bird). For example, UAV air traffic control may hover the UAV where its flight path is determined to coincide with another nearby object (which may be in motion or stationary within the UAV flight region).

Radar processing of the signal information received from the receiving antennas 221, 231, 241 may be carried out according to known methods for radar signal processing. According to an exemplary embodiment, a passive radar processor (such as any of those radar processors 222, 232, 242) is configured to receive the signals from an antenna (221a or 221b, 231, 241 as depicted in FIGS. 1 and 2), and manipulate the information to produce information about the position, size, and movement of an object within the monitored skyward region. The information provides detection of the object and also provides tracking of the object as the object moves within the region. The movement of the skyward object, including its direction and speed, may be determined by the radar detection system. The detection system also may be used to provide information about the object itself, and distinguish between and/or identify the type of object or likely type of object. For example, one signal pattern may be identified to correspond with a UAV, while other signal pattern may identify an object as a bird. The system preferably is configured to process the signal information and may be provided with patterns that correspond with anticipated objects that would be detected, such as, for example, UAVs, birds, balloons, and the like. One or more identification patterns may be stored as a reference for a particular object. A database of signal patterns may be generated based on expected or previous detection of known objects within the region. The database may be consulted for matches when the radar system receives reflected signals from the receiving antenna. Preferably, this is carried out by a processing component, such as a radar processor (e.g., 222, 232, 242) or the aggregating tracking computer 280.

FIG. 3 illustrates one example of a method that may be implemented in conjunction with the radar processing of the signals received by the receiving antennas. As depicted in FIG. 3, an antenna array, block 400, is shown to represent a plurality of antennas. The plurality of antennas, for example, may be those depicted in connection with the system in FIG. 1, such as the receiving antennas 221, 231, 241 (and the receiving antennas or array, 221a, 221b in FIG. 2). According to some embodiments, the antenna array may be a simple antenna array that is constructed with several antenna elements and element-level digitization. Digital beamforming, block 401, is carried out to determine the direction of arrival of signals received. The direction of arrival of the reflected signals or echoes may be calculated using standard radar beamforming techniques. Although a plurality of antenna elements are illustrated, according to some embodiments, a pair of antenna elements may be utilized and the phase difference of arrival used to determine the direction of arrival of echoes. According to some embodiments, a phased array of antennas may be used. The signal received preferably undergoes signal conditioning, block 402. In addition, the copy of the transmitted signal, block 403, also may be conditioned, block 404. Signal conditioning may be carried out to manipulate some portions of the signal prior to cross-correlation processing, block 406. The signal conditioning, blocks 402, 404, may be carried out to improve the signal to interference ratio (SIR). Although the beamformer, block 401, is depicted separately, it may comprise part of the signal conditioning. The radar processor preferably is configured with an adaptive filter. The adaptive filter preferably is employed to manipulate the signal to remove the direct signal. Adaptive filtering also may be referred to as adaptive cancellation, block 405. According to some embodiments, for example, the adaptive filtering is carried out by examining the correlation properties of the received data across channels. In this manner, the presence of jamming and clutter entering the antenna pattern sidelobes may be identified. The channels may be combined according to a set of weights to provide the antenna with a high-gain mainlobe and generally low sidelobes. The adaptive filtering also may combine the channels and provide weighting to produce a null in the antenna pattern at the angle of arrival of the jammer. In the radar processing example illustrated, processing may include cross-correlation processing, block 406. Cross-correlation processing, block 406, is designed to measure similarity of two series as a function of the lag of one relative to the other. In the radar processing example, cross correlation, block 406, provides estimates of the bistatic range and bistatic Doppler shift of each target echo. Cross correlation acts as the matched filter. This may be implemented by providing a bank of matched filters, each matched to a different target Doppler shift. Cell-averaging constant false alarm rate (CAFR) algorithm processing is implemented, block 407. The CAFR detection, block 407, is designed to detect targets. An adaptive threshold is applied in order to detect targets on the cross-correlation surface. The radar processor may be configured to implement CFAR detection so that all returns above the cross-correlation surface are considered to be targets of detection. The targets (such as UAVs and other low flying objects) preferably are tracked throughout time, and therefore, information about their movement, direction and velocity may be ascertained. For example, in the case of objects such as UAVs, birds, balloons, etc. moving within the monitored skyward region, frequency shifts in echoes reflected from these moving objects (e.g., Doppler effect) may be observed and detected. The information may provide the location of the low flying object, such as a UAV, bird or the like, as well as in which direction the object is moving and how fast. Preferably, for each transmitter in the system, or in the aggregate each transmitter in the portion of the network region being monitored, line-tracking is implemented through a line-tracker, blocks 408a, 408b, 408c (representing a line-tracker for a respective transmitter). For example, referring to FIG. 1, the transmitters 261, 271, 281 preferably provide signals associated with the respective line trackers 408a, 408b, 408c. The radar processor may be configured to implement line-tracking of target returns from individual targets. This preferably is carried out over time, in the range-Doppler space generated by cross-correlation processing, block 406. Tracking association and track estimation, block 409, is carried out to determine the location of the UAV or other low flying object. The tracking association may be carried out using a single transmitter and single receiver, or, according to some embodiments, may be carried out using multiple receivers, where the object, such as the UAV or other object, may potentially be detected by each receiver, associated itself with one or more transmitters. Although the exemplary embodiment is illustrated with a plurality of nodes, and reference is made to a transmitter associated with each receiver node depicted, the system may be configured so that multiple receivers are employed to receive signals that are propagated by the transmitter from a single tower antenna, and reflected, and the signals received are processed to determine which target returns from one transmitter correspond with those on the other receivers. The signal returns are associated to determine the object location using the signal information provided from the reflected signals received by one or more receivers. A target track, block 310, is generated from the processed signal data, and provides an indication of the direction, speed and position of the UAV (or other object). Accordingly, this is one example of radar processing, and other radar processing methods may be used to process the signal data generated from the network system and provide UAV location and tracking.

As depicted in FIG. 2, a signal ray trace 306 is shown. A signal or ray 305 from the transmitter 121 encounters the object, the UAV 1051 within the region of coverage. In FIG. 2, the UAV 1051 has moved from its position represented in FIG. 1. For reference, the UAV is within the skyward region represented by the signal cone 220. According to one example, ray tracing may be implemented to track the movement of the object, such as the UAV 1051. Upon reaching the UAV 1051, some portion of the signal ray 305 may be absorbed, or otherwise scattered. The signal ray 306 represents a signal reflected off of the UAV 1051 (the portion of the ray 305 reflected) that is available for receipt by the receiving antenna 221a or 221b. The radar processor 222 preferably has knowledge of the signal ray 305 via the receipt of the signal copy 310. Although one representative signal ray 305 and one reflected signal ray 306 are illustrated, a number of signal rays may be sent out within the region 220, and each reflected signal ray trace is identified, and the process repeated to derive the path of the UAV 1051.

According to preferred embodiments, the system is implemented in conjunction with the wireless networking equipment for a skyward communications system. For example, a transmitter may send out a transmit signal which may comprise a continuous wave signal which, upon being radiated on and reflected off of an object, is detected by a receive antenna associated with a radar processor. According to preferred embodiments, the transmit signal is an RF signal provided for cellular communications (e.g., such as a transmission to a UAV from a skyward directed transmitter/antenna). According to preferred embodiments, the radar processor receives a copy of the transmit signal (which may be referred to as a direct signal), and also receives (through an associated receive antenna) signals that are reflected from an object. The reflected signals are not direct (and may be considered to be scattered). The radar processor is configured to receive the signals (both the direct and reflected), and differentiate the signals. The signal attributes (such as, for example, transmission time, receive time, frequency and modulated data) are obtained by the radar processor, and analyzed to provide a detection result. As an object (such as a UAV or bird) remains within the detection region where the transmissions are taking place, the reflected signals continued to be received by the radar processor, and the objects movement and position may be monitored and tracked. The detection area may comprise a plurality of detection regions to track objects throughout the area. Radar processors may be configured as part of a network to provide information to a radar system component, which may be an aggregating computer networked with the radar processors. Alternatively, some radar processors may be provided on a node and the node aggregated with radar processors of other nodes.

According to some embodiments, the signal arrival times may be determined and used to provide a radar detection response. Embodiments may configure the radar processor to implement processing of the signals to separate the signals. Where an object such as a UAV or bird is on motion, the object's motion may induce a Doppler shift in the reflected or scattered signal from the UAV or bird, for example. The shift facilitates a separation in frequency of the two signals. The radar processing may be carried out in accordance with processing methods for detecting and evaluating the signals. The differentiation of the signals provides a way to determine the presence of an object in the skyward region.

According to embodiments of the system, the transmission may utilize transmission codes which are imposed on the radio frequency carrier of the transmitter. The codes may be provided as a series of discrete transmitter phase levels. The codes may be random codes which are pseudo random codes because they may be recurrent after L bits. The transmission may involve a code word or sequence of length L bits, which repeats periodically based on the number of shift register stages N. For example, for L bits, the expression may be L=2^N−1, for N shift register stages. According to one embodiment a clock-pulse generator is provided and is configured to feed a coder-shift register. For example, each time a clock pulse is applied the state of the shift register may shift one stage (e.g., to the right when considering a linear representation). According to preferred embodiments, the codes, including pseudo random codes, are codes provided in conjunction with the carrier's RF transmissions from the transceiver of the WNE.

Although the radar processors are illustrated in the depictions, the radar processors may be provides as separate components, or may be provided in connection with one or more of the distributed networking hardware. Although one embodiment is illustrated in FIG. 3, passive radar processor may manipulate the signals received in accordance with any one of a number of methods other than what is depicted in FIG. 3.

Embodiments of the system utilize communications transmissions that are being radiated to communicate with UAVs in the region of coverage. According to some alternate embodiments, an alternate implementation may be provided to generate information when no communicating transmissions are being radiated, such as, for example, where there are no UAVs within the coverage region. The system, in this alternate implementation, may cause the skyward pointing communications systems to send out a regular transmission to the sky in absences of a regular communications transmission to UAVs. According to an alternate embodiment, a transmitter may send periodic or regular transmissions skyward. These may be generated by the skyward communications system. According to some embodiments, in the event that there are no UAV communication transmissions for a set period of time, the regular transmissions may be sent out. According to some alternate embodiments, the regular transmissions may be generated when there is an absence of a communication transmission from a transmitter for a predetermined period. The alternate system also may be configured to receive a signal from a radar detection component, when, for example, a regular transmission results in the radar processor making a positive detection of an object in the skyward region or zone. The transmitter, upon receipt of a notification signal resultant from the radar processor detection, may continue to send out regular transmissions to monitor the detected object. The regular transmissions may be sent out, or alternatively, a continuous signal wave may be radiated so that the radar processor may receive echoes from the detected object as the object remains within and/or moves through the zone of detection. Accordingly, upon the objects moving out of the zone, and a period of inactivity, the system may resort back to the periodic transmissions, until such time that another object is detected. According to these alternate implementations, copies of the periodic transmissions may be sent to the associated radar processor. The radar processor processes the signals received from the receive antenna and the signal copy of the periodic transmission to determine whether an object, for example, a bird (or other non-communicating object) is present in the region.

These and other advantages may be realized with the present invention. While the invention has been described with reference to specific embodiments, the description is illustrative and is not to be construed as limiting the scope of the invention. Various modifications and changes may occur to those skilled in the art without departing from the spirit and scope of the invention described herein and as defined by the appended claims.

What is claimed is:

1. A distributed low altitude bi-static radar system comprising:
   a) wireless networking equipment for producing RF signals;
   b) at least one transmitting antenna coupled with the wireless networking equipment for radiating signals in a skyward direction;
   c) at least one receiving antenna for receiving signals reflected from a low flying object including at least one UAV;
   d) a radar processor electronically coupled with the wireless networking equipment to receive signals therefrom, and being coupled with the receiving antenna to receive signals therefrom; and
   e) a computing component coupled to receive information from the radar processor;
   f) wherein the computing component is configured to receive information from a plurality of radar processors distributed throughout a network for a region of coverage, and wherein said computing component aggregates said information to detect and track low flying objects over the region of coverage;
   g) wherein said wireless networking equipment includes a transmitter for transmitting the RF signals which are broadcast from said transmitting antenna, and wherein said wireless networking equipment provides a copy of said RF signals to said radar processor;
   h) wherein said wireless networking equipment is configured to communicate with the UAV via said RF signals, and wherein said RF signals that communicate with said UAV are the same RF signals that serve as the radar detection signals, and are the same RF signals for which a copy is provided to said radar processor; and i) wherein the system comprises a communications system for communicating with the one or more UAVs, wherein the RF communications that are transmitted by the transmitting antenna for communications with the one or more UAVs are used for both communications with the UAV and for radar detection, and wherein the transmitted RF signals reflected off of an object comprise communications communicated from the wireless networking equipment to the UAV; and j) wherein an RF communication for the at least one of the one or more UAV's is transmitted to the UAV to provide command, control or navigation function to the UAV, and k) wherein a copy of the RF communication transmitted to the UAV that provides command, control or navigation function to the UAV is sent to the radar processor, and l) wherein the RF communication transmitted to the UAV that provides command, control or navigation function to the UAV is also the radar signal that detects the UAV and/or other objects in the region of coverage by reflecting off of the UAV and/or other objects in the region of coverage, and m) wherein said receiving antenna receives echoes which are the RF communication transmitted to the UAV that are reflected off of the UAV and/or other objects in the region of coverage.

2. The system of claim 1, wherein said wireless networking equipment comprises a transceiver, a power supply, and a processor for processing communications transmitted and received over a network.

3. The system of claim 1, wherein at least one of said transmitting antenna and said receiving antenna comprises an antenna array.

4. The system of claim 1, wherein at least one of said transmitting antenna and said receiving antenna comprises a phased array.

5. The system of claim 1, wherein said system is configured to detect reflected RF radiation reflected off of a corner reflector of a UAV.

6. The system of claim 2, wherein the transceiver is configured to produce a transceiver signal that is polarized in a circular direction and wherein the receiving antenna is polarized in the opposite circular direction from the communications transceiver signal in order to reduce direct interference from the communications transceiver signals and provide increased responsiveness to reflections from objects.

7. The system of claim 1, wherein a plurality of wireless networking equipment is provided forming a plurality of nodes.

8. The system of claim 7, wherein said nodes are configured to provide signals indicating the presence of objects within the regions of the respective nodes.

9. The system of claim 1, wherein a plurality of transmitting antennas are coupled with a respective plurality of wireless networking equipment for radiating signals in a skyward direction from the transmitting antenna; wherein each said plurality of transmitting antennas are configured to provide a skyward region of signal coverage; wherein a respective plurality of receiving antennas are provided for receiving reflected signals generated from said respective plurality of transmitting antennas; wherein each receiving antenna is located proximate to a respectively associated transmitting antenna, and wherein a said transmitting antenna and said respectively associated receiving antenna define a detection region by their respective signal radiation and signal reception; wherein said system comprises a plurality of detection regions; and wherein said computing component detects and tracks objects within the detection regions.

10. The system of claim 9, wherein each said transmitting antenna emits a signal polarized in a one circular direction, and wherein each respectively associated receiving antenna is polarized in the opposite circular direction of its respectively associated transmitting antenna.

11. The system of claim 9, further comprising a UAV air traffic control system that is configured having at least one processor for processing information and is electronically coupled with said radar processor to receive tracking information for low flying objects within the region of detection, and to manage UAV operations by controlling one or more UAVs, including said at least one UAV, to minimize potential collisions with other UAVs and other objects within the detection region detected by the system.

12. The system of claim 10, further comprising a UAV air traffic control system that is configured having at least one processor for processing information and is electronically coupled with said radar processor to receive tracking information for low flying objects within the region of detection, and to manage UAV operations by controlling one or more UAVs, including said at least one UAV, to minimize potential collisions with other UAVs and other objects within the detection region detected by the system.

13. The system of claim 1, wherein said transmitting antenna provides RF communications for communications with one or more UAVs, wherein said wireless networking equipment comprises at least one transmitter, wherein said RF communications comprise RF signals generated by the transmitter; and wherein said receiving antenna is configured to receive echoes of the transmitted RF signals that are reflected off of an object.

14. The system of claim 13, wherein the transmitter generating the RF signals provides a copy of the signals to the radar processor.

15. The system of claim 14, wherein the radar signals comprise communication signals transmitted to one of the UAVs from the at least one transmitting antenna.

16. The system of claim 15, wherein said RF signals comprise coded modulation.

17. The system of claim 15, wherein the codes of the coded modulated RF signals comprise codes from signal communications between the at least one transmitting antenna and the at least one UAV.

18. The system of claim 17, wherein said codes are provided from said transmitter to both (i) said at least one transmitting antenna and (ii) said radar processor.

19. The system of claim 17, wherein said transmitter is linked to provide said codes to said radar processor.

20. The system of claim 17, wherein said transmitter is linked to provide said codes to a plurality radar processors within the transmission and echo range of said transmitter.

21. The system of claim 1, wherein said system comprises a skyward communications system for RF communications from a plurality of transmitters and a respective plurality of associated antennas that radiate RF signals from said respective plurality of transmitters; wherein a plurality of radar processors with associated receiving antennas are provided for receiving signals from the respective plurality of transmitters that are reflected off of skyward objects.

22. The system of claim 21, wherein said plurality of radar processors receive a copy of a transmitted RF signal from the transmitter.

23. The system of claim 22, wherein said radar processor is configured to process phase differences between a reflected signal that is detected by the radar processor associated antenna, and a signal copy received from the transmitter.

24. The system of claim 1, wherein codes are imposed on the transmitter frequency carrier.

25. The system of claim 1, wherein codes are imposed on the transmitter frequency carrier that comprise pseudo random codes.

26. The system of claim 25, wherein said pseudo random codes are generated for a code length of L bits which repeats periodically based on a number of shift register stages N, wherein for the number of shift register stages N, L bits is determined by the expression $L=2N-1$.

27. The system of claim 1, wherein codes are imposed on the transmitter frequency carrier that comprise pseudo random codes.

28. The system of claim 24, wherein said wireless networking equipment is configured to communicate with UAVs, and wherein the codes are transmitted skyward and also are sent to the associated radar processor as part of the copy of the transmission.

29. The system of claim 1, wherein said wireless networking equipment is supported on a tower.

* * * * *